United States Patent [19]
Buser et al.

[11] 3,874,616
[45] Apr. 1, 1975

[54] ELECTROSTATIC FIELD MEASURING DEVICE

[75] Inventors: Rudolf G. Buser, Wall; Helmuth M. Kaunzinger, Neptune, both of N.J.

[73] Assignee: The United States of America as represented by the Secretary of the Army, Washington, D.C.

[22] Filed: July 2, 1973

[21] Appl. No.: 376,028

[52] U.S. Cl............. 244/17.11, 244/1 A, 317/2 E, 324/72, 340/27 R
[51] Int. Cl............................................ B64d 47/00
[58] Field of Search............. 244/17.11, 1 A, 1 SA; 324/32, 72; 317/2 E, 2 R, 4; 340/27 R

[56] References Cited
UNITED STATES PATENTS

| | | | |
|---|---|---|---|
| 3,260,893 | 7/1966 | Cierva et al...................... | 340/27 R |
| 3,370,225 | 2/1968 | Winder................................ | 324/72 |
| 3,427,504 | 2/1969 | Cierva et al. ..................... | 244/1 A |
| 3,482,235 | 12/1969 | Johnson.............................. | 324/72 |
| 3,525,866 | 8/1970 | Sagalyn et al..................... | 244/1 SA |

*Primary Examiner*—Blix, Trygve M.
*Assistant Examiner*—Galen L. Barefoot
*Attorney, Agent, or Firm*—Nathan Edelberg; Robert P. Gibson; Arthur L. Bowers

[57] ABSTRACT

This disclosure relates to electrostatic field strength and particularly to a device for detecting and indicating the strength of an electrostatic field in the vicinity of an aircraft. More particularly, this invention relates to a device for detecting and indicating the field strength in the vicinity of a helicopter or other device having rotating blades large enough physically to substantially alter the field strength pattern about the aircraft. In this device, the cyclically changing pattern of field strength caused by the rotation of the blades is sensed by a field probe to produce an alternating voltage that is applied to an amplifier and indicator that may be synchronized with the rotation of the blades, for noise component reduction.

2 Claims, 2 Drawing Figures

ELECTROSTATIC FIELD MEASURING DEVICE

BACKGROUND OF THE INVENTION

Electrostatic charges are generated in a well known manner and charges are built up on many types of moving equipment. On some equipment, such as moving aircraft, the electrostatic charges can reach extremely high values and build up potentials that can become hazardous as the aircraft approaches ground or an oppositely charged body. It becomes necessary to provide a means for measuring the strength of the electrostatic field between an aircraft and an adjacent object or ground to determined whether or not the electrostatic potential of the aircraft is at a dangerous level with respect to the other object and whether or not some means should be employed to discharge the aircraft before any harm is done.

There are some known means for measuring the strength of an electrostatic charge. The best known are the devices of the electrometer type that have very-light, fragile vanes that repel each other and separate when charged to give an indication of the charge value. These electrometers are mainly laboratory devices and are cumbersome as well as fragile and would not work well, if at all, in a moving vehicle, or an aircraft in flight.

For more rugged use, such as that of an aircraft in flight, the field mill has been the best available means for measuring the strength of an electrostatic field. The conventional field mill yields electrostatic-field-strength readings derived from charges induced on a sensor electrode which is alternately covered and exposed to an external electrostatic field by the blades of a rotating vane. The induced charges are proportional to the external field surrounding the sensor electrode.

This method produces a pulsating voltage on the sensor electrode that is proportional to the field strength and that can be readily amplified and applied to a device that indicates the relative field strength. However, the changes in the electrostatic field caused by the rotating vane, only inches in diameter, are necessarily over a very small area and are subject to random contributions from the recirculating charged-particle accumulation known to exist directly below the fuselage of a helicopter where it cannot be blown away.

SUMMARY OF THE INVENTION

This device combines the effect of the large rotor blades of a helicopter on an electrostatic field, surrounding a helicopter in flight, with the ability of a sensor electrode of an electrostatic field probe to detect changes in the electrostatic field. As the blades rotate, a given rotor blade moves from one side of the aircraft to the other, and the pattern of the portion of the electrostatic field that is effected by the blade is similarly moved from side to side. In other words, given equipotential lines of the electrostatic field, particularly in the vicinity of the rotor blade, are moved correspondingly closer to or further away from corresponding areas of the helicopter. By sensing the electrostatic field with a conventional field probe, in one of the effected areas of the helicopter, an alternating voltage will be generated on the sensor electrode of the probe by the cyclic variations in field strength. This voltage is proportional to the strength of the electrostatic field and is synchronized with the rotation of the blade. This alternating voltage can be amplified and detected to indicate the relative strength of the electrostatic field.

This alternating voltage can also be applied to a lock-in amplifier that may also be synchronized with the rotation of the rotor blades. In this way, noise, originating from atmospheric disturbances and radio frequencies used with communication and navigation systems, can be considerably decreased and the sensitivity increased.

In this custom, the electrostatic field fluctuates over the entire field of influence of the rotor blade to cover a very much wider area than conventional field mills that have rotors only a few inches in diameter. This provides an improved means to assess the average electrostatic field between a helicopter and ground, and eliminates selective field metering in the vicinity of a field mill. This also provides improved penetration of the accumulation of recirculating, charged-particles directly below the fuselage of a helicopter.

DETAILED DESCRIPTION OF THE PREFERRED EMBODIMENT

Figure 1:
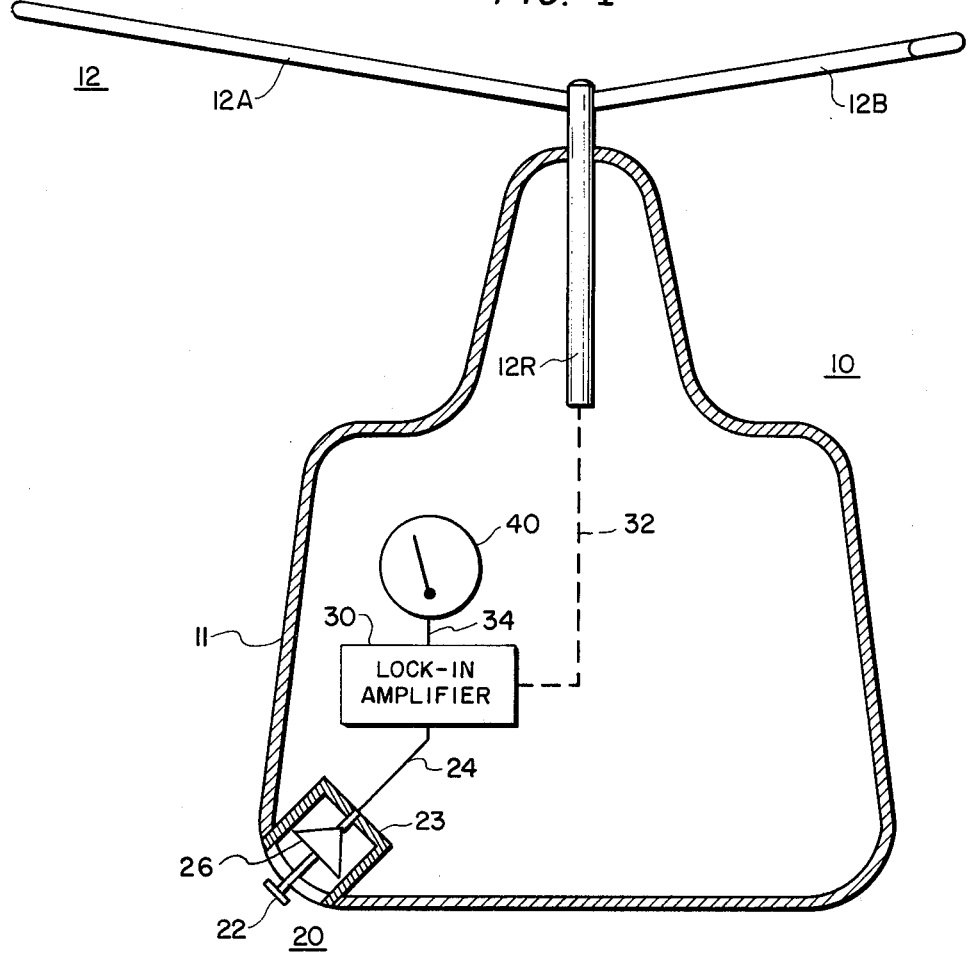
FIG. 1 shows a representative cross section of a typical helicopter which includes the invention.

Referring now particularly to FIG. 1, a representative cross section of a helicopter fuselage 10 is shown having a rotor 12 with blades 12A and 12B visible. The rotor turns about a shaft 12R extending through the top of the fuselage. A field probe 20 has a casing or enclosure 23 that is mounted within the fuselage of the aircraft. The field probe has a sensor electrode 22 projecting, through an opening in the enclosure, slightly beyond the metallic surface 11 of the aircraft.

The output of the sensor electrode 22 is connected to a preamplifier 26 within the enclosure. The output 24 of the preamplifier is connected to the input of a lock-in amplifier 30 that is also coupled, through an electromechanical synchronizing link 32, to the shaft 12R of the rotor. The output 34 of the lock-in amplifier is connected to a meter or indicator 40.

Figure 2:
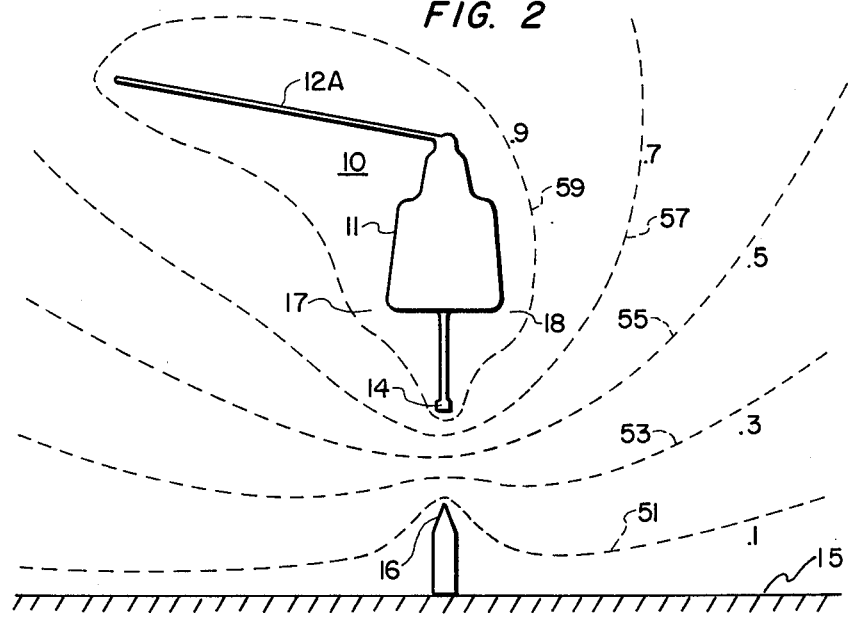
FIG. 2 shows a two dimensional plot of equipotential lines existing between a charged helicopter and a ground point.

FIG. 2 shows a cross section of a typical electrostatic field between the potentials of the projections 14 of the helicopter and a grounded point 16. The helicopter 10 corresponds to the helicopter of FIG. 1, with an outer, metallic surface 11 and a rotor blade 12A.

The equipotential lines 51 through 59 are shown to indicate the shape of the electrostatic field with relation to the rotor blade 12, the helicopter, and the ground point. The odd-numbered lines, as indicated, are shown as typical of the family of lines. Other blades, such as 12B, of FIG. 1, are not seen because this a cross-sectional cut.

It is seen here that the field strength lines that are closest to the helicopter, are considerably changed by the position of the rotor blade 12A, to the extent that the equipotential line 9 adjacent to 17 on one side of the helicopter is further away from the helicopter than the same line adjacent to 18 on the other side. The other equipotential lines, 7 and to some extent 5, are also effected by the rotor blade, although the equipotential lines of the electrostatic field closer to the ground point are less effected.

This plot reflects the two possible extreme cases. The left hand side shows the field with a rotor blade at its maximum projection and the right hand side shows the field of the absence of a rotor blade. When the field is considered as a function of time, it will fluctuate between the two extremes, synchronously with the rotation of the rotor blade.

In operation, as the field fluctuates, a corresponding fluctuating charge is induced on the sensor electrode 22 of the field probe 20. This charge will also fluctuate, synchronously with the rotation of the rotor blade, to produce an alternating potential component on the sensor. This alternating potential can be selectively amplified to sufficient strength to be applied to a meter 40 or any other useful circuit.

The lock-in amplifier 30 can also be synchronized with the rotation of the rotor blade by contacts or other means on the shaft 12R, to gate the amplifier at the time during each revolution of the rotor when one of the blades is at its maximum projection from the side where the field probe is mounted, as seen in FIG. 2. The lock-in amplifier can also be gated at the time when the rotor blade is at the position furthest away from the side of the helicopter where the field probe is mounted. This would provide amplification of the alternating values of electrostatic charge potentials on the sensor electrode in phase with the rotation of the rotor blade. This reduces noise level, in a well-known manner, and thereby increases the sensitivity of the device and its effectiveness in marginal situations.

A preamplifier 26 would normally be required to match the extremely-high output impedance of the sensor electrode to the input impedance of a conventional amplifier. Any desired degree of amplification can also be provided. This relatively-small, low-powered preamplifier 26 could be mounted within the enclosure 23 as indicated in FIG. 1. The variation of the alternating potentials, which are proportional to the absolute values of the strength of the electrostatic field, can be amplified to the level necessary to be applied to the indicator 40 as a reading of the absolute value of the field strength. If the d-c component of the preamplifier 26 is filtered out and amplified, the polarity of the electrostatic field can also be determined.

We wish it to be understood that we do not desire to be limited to the exact details of construction shown and described, for obvious modifications will occur to a person skilled in the art.

What is claimed is:

1. An electrostatic field measuring device for a helicopter having a plurality of rotating blades projecting outwardly from a point above the fuselage of said helicopter comprising:

a sensor electrode projecting downwardly and outwardly from said helicopter at a location on the lower surface of said fuselage substantially removed from the central axis of said helicopter;

amplifying means including a lock-in amplifier having an input connected to said sensor electrode, for amplifying at least any alternating current component of the output of said sensor electrode;

means associated with said rotor blades for gating said lock-in amplifier synchronously with said rotor blades to sample any signal on said sensor electrode repetitively to provide an alternating output at a reduced noise level; and indicating means connected to the output of said amplifying means for indicating the amplified level of any alternating current component from said sensor electrode, which is proportional to the electrostatic field adjacent to said device.

2. An electrostatic field measuring device according to claim 1 having a rotor shaft projecting through a portion of the upper fuselage of said helicopter, said rotor shaft being coupled to drive said plurality of rotating blades; and means associated with said rotor shaft for developing a signal for gating said lock-in amplifier synchronously with the rotation of said rotor blades.

* * * * *